United States Patent
Taillant et al.

(10) Patent No.: US 7,140,840 B2
(45) Date of Patent: Nov. 28, 2006

(54) TURBOSHAFT ENGINE COMPRISING TWO ELEMENTS CONNECTED TO EACH OTHER WITH THE INTERPOSITION OF A SEAL

(75) Inventors: Jean-Claude Taillant, Vaux le Penil (FR); Marc Marchi, Le Mee sur Seine (FR)

(73) Assignee: Snecma Moteurs, Paris (FR)

( * ) Notice: Subject to any disclaimer, the term of this patent is extended or adjusted under 35 U.S.C. 154(b) by 130 days.

(21) Appl. No.: 10/946,067

(22) Filed: Sep. 22, 2004

(65) Prior Publication Data
US 2005/0095123 A1    May 5, 2005

(30) Foreign Application Priority Data
Sep. 30, 2003    (FR) .................................. 03 11420

(51) Int. Cl.
*F01D 11/00* (2006.01)
(52) U.S. Cl. ................ 415/191; 415/208.2; 415/211.2; 277/654
(58) Field of Classification Search ................ 415/231, 415/173.3, 174.2, 208.2, 211.2, 191; 277/654
See application file for complete search history.

(56) References Cited
U.S. PATENT DOCUMENTS

| | | | |
|---|---|---|---|
| 3,690,785 A | | 9/1972 | Lind |
| 3,807,898 A | * | 4/1974 | Guy et al. ............... 416/220 R |
| 4,314,793 A | * | 2/1982 | DeTolla et al. ............. 415/135 |
| 5,749,218 A | * | 5/1998 | Cromer et al. ................ 60/796 |
| 5,797,723 A | | 8/1998 | Frost et al. |
| 5,987,879 A | * | 11/1999 | Ono ............................ 60/800 |
| 6,318,728 B1 | | 11/2001 | Addis et al. |
| 6,464,232 B1 | | 10/2002 | Marchi et al. |
| 6,502,825 B1 | * | 1/2003 | Aksit et al. ................. 277/355 |

FOREIGN PATENT DOCUMENTS

| | | |
|---|---|---|
| EP | 0 787 890 A2 | 8/1997 |
| EP | 1 002 972 A1 | 5/2000 |

* cited by examiner

*Primary Examiner*—Ninh H. Nguyen
(74) *Attorney, Agent, or Firm*—Oblon, Spivak, McClelland, Maier & Neustadt, P.C.

(57) ABSTRACT

A turboshaft engine, such as for example a turbine, including a segmented seal between two longitudinally adjacent elements such as, for example, a casing and a ring of sectors of vanes. According to one embodiment, a seal is interposed between a casing and a ring of sectors of vanes and includes a plurality of flexible segments having a straight deformation zone and a straight fluid-tight bearing zone.

11 Claims, 2 Drawing Sheets

TURBOSHAFT ENGINE COMPRISING TWO ELEMENTS CONNECTED TO EACH OTHER WITH THE INTERPOSITION OF A SEAL

The invention relates to a turboshaft engine, typically a turbine and more particularly its subject is an improvement aimed at improving the peripheral fluid-tightness of the junction between two static components of the latter that are subject to large relative displacements (axial, radial, tangential). For example, the invention applies particularly to the junction between a ring of sectors of vanes (turbine nozzle guide vanes, for example) and an adjacent casing.

In a turboshaft engine of the type defined above, the fluid-tightness of the junction between the said two components can be provided by an annular steel diaphragm, fitted in one component and applied against the other. An example of this type of assembly is described in the document GB 2 035 474. The purpose of the invention is to propose a seal of better performance, lower cost price and offering great ease of assembly and maintenance.

More particularly, the invention relates to a turboshaft engine comprising two longitudinally adjacent elements connected to each other with the interposition of a seal installed between them, wherein the said seal consists of a plurality of flexible segments arranged in a ring, and wherein each segment is mounted in a housing defined in one of the elements and comprises a flat blade having a straight deformation zone and a straight fluid-tight bearing zone bearing onto a flat and smooth surface of the other component.

Typically, the abovementioned element comprising the said smooth surface is a casing, whilst the element carrying the said segments is a ring of sectors of vanes.

Preferably, each segment comprises several finer laminas, joined side by side with each other and forming a said flat blade. By way of example, the flat blade (the assembly of laminas) is mounted in an insert with a U-shaped profile and a straight opening. The bending zone mentioned above is defined outside of this insert in the vicinity of its straight opening. This assembly guarantees a bending zone that is itself straight and parallel with the edge of the said flat blade which bears against the flat and smooth surface of the other element.

Advantageously, the insert is housed in a corresponding housing of the element which carries the said segment.

The invention will be better understood and other of its advantages will become more apparent on reading the following description, given solely by way of example and with reference to the appended drawings in which.

Figure 1:
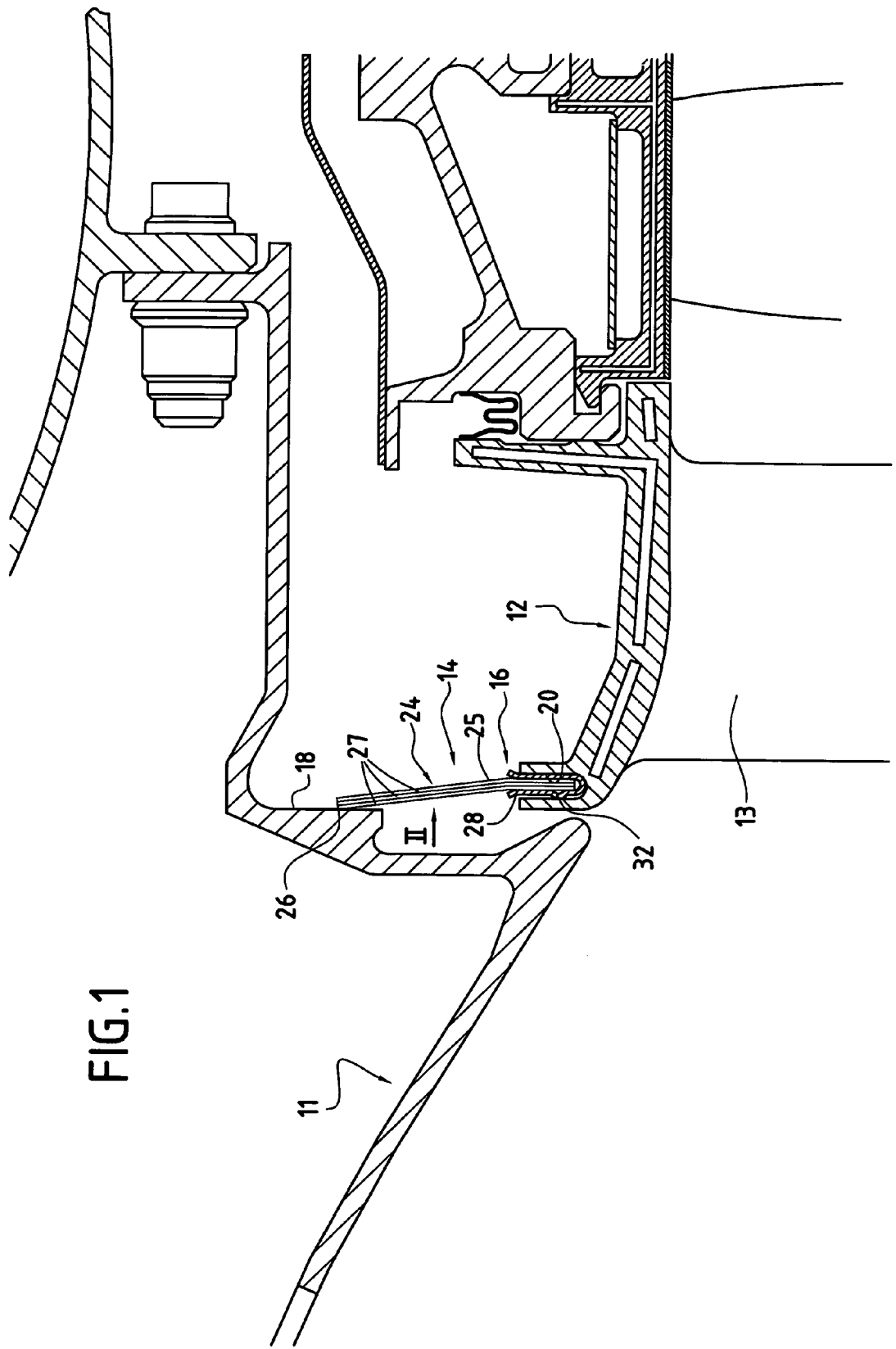
FIG. 1 is a partial cross-sectional view of a turboshaft engine equipped with the improvement according to the invention.
Figure 2:
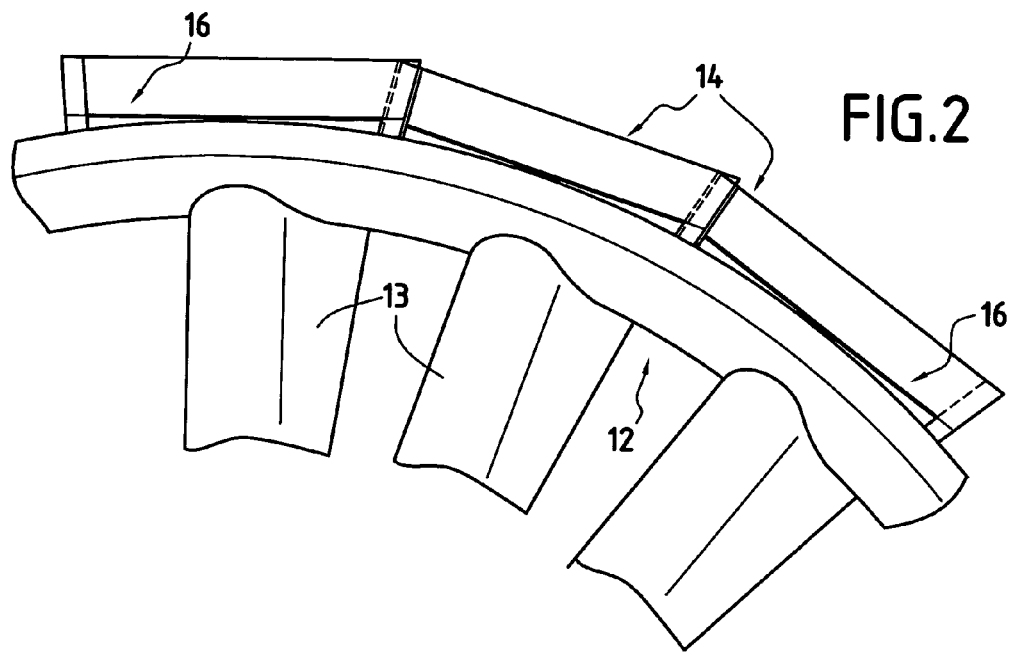
FIG. 2 is a detail view in the direction of the arrow II shown in FIG. 1.
Figure 3:
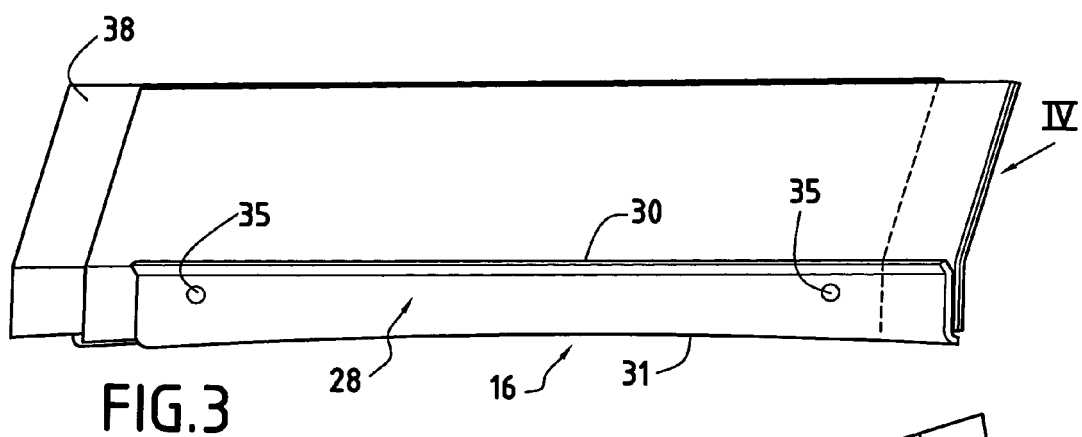
FIG. 3 is a view of one of the segments.
Figure 4:
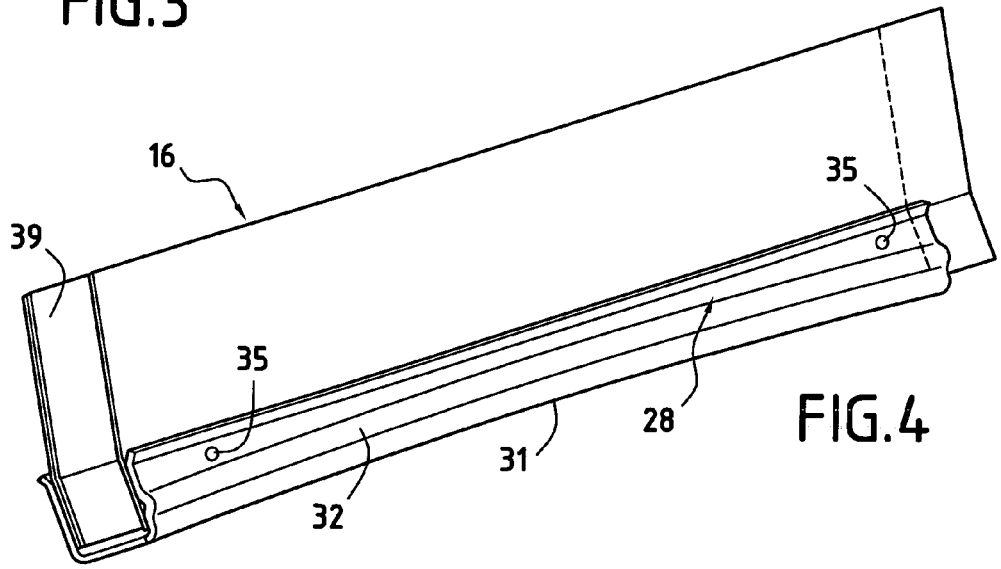
FIG. 4 is a view in the direction of the arrow IV shown in FIG. 3.

In FIG. 1 there are partially shown a turbine and, in particular, two elements of the latter: a casing 11 and a ring of sectors of vanes 12 for guiding the gasses towards the turbine wheel. The vanes themselves bear the reference 13. These two longitudinally adjacent elements are fixed but relative displacements (axial, radial, tangential) can occur between them. A peripheral seal 14, of globally annular shape, is installed between the two elements to ensure the fluid-tightness with respect to the exterior. The invention principally relates to the structure of this seal and its mounting between the two elements. This seal and the parts which form it are shown in FIGS. 2 to 4.

The seal 14 consists of a plurality of segments 16 that are flexible, generally straight and arranged in a ring. The segments are carried by one of the elements, in this case the ring of sectors of vanes 12, and bear against a flat smooth surface 18, trued and polished (known as "faced") of the casing. More particularly, each segment 16 is mounted in a corresponding housing 20 defined at the outer periphery of the ring of sectors of vanes 12. Such a segment comprises a flat, elastic blade 24 having a straight deformation zone 25 defined in the vicinity of the edge of the housing 20 and a fluid-tight bearing zone 26, also straight, bearing on the flat and smooth surface 18. In this case the bearing zone substantially merges with the straight edge of the flat blade 24, parallel with the folding zone 25. Furthermore, advantageously, each flat blade 24 consists of several laminas 27, joined side by side with each other, which improves the flexibility of the said blade. In this example, the said laminas are three in number and they are made of steel.

As can be seen in FIG. 1, in the example shown, the surface 18 is radial and faces the peripheral space defined outside of the ring of sectors of vanes 12. The pressure which exists in this zone, higher than that which exists in the annular space extending on the other side of the seal, generates a force on the said seal which increases the bearing force of the blades on the surface 18 and consequently its efficiency.

Each segment comprises an insert 28 having a U-shaped profile and having a straight opening 30 in which the said blade 24 is mounted (that is to say, in fact, three joined together laminas 27). It is therefore the straight opening of this insert that creates a folding zone 25 that is itself straight. The insert has approximately the shape of the housing 20 in which it is housed. In particular, the bottom 31 of this insert is curved in order to coincide with the bottom of the housing 20, which is also curved. The ring of sectors of vanes 12 comprises as many housings 20 as there are segments in order to constitute the seal 14. The insert comprises a longitudinal protrusion 32 on one of its faces, extending parallel with the curved bottom 31, which ensures its force-fitting in the said housing. The laminas engaged in the insert are firmly attached to the latter by retaining pins 35. The force fitting of the segment in the housing causes the clamping effect of the faces of the insert 28, which ensures fluid-tightness at the level of the ring of sectors of vanes. The protrusion 32 ensures the force fitting of the insert in the housing.

Moreover, each blade comprises thinned overlap zones 38, 39 at its ends. These thinned overlap zones are defined by longitudinal offsets between the laminas 27. The laminas are shaped, or more precisely slightly bent, in the vicinity of the straight opening of the insert. They are pre-stressed on assembly, such that they bear against the said smooth surface 18.

The behavior of the seal in the case of relative displacement between the two elements is obvious from the preceding description. The fact of imposing a straight deformation zone facilitates flexion and limits stresses. Similarly, the design of the seal in the form of segments facilitates assembly and maintenance, the said segments being able to be fitted and replaced by simple force fitting. The seal is sized according to the foreseeable relative displacements and to the pressure to be withstood. The system adapts perfectly to the displacements and misalignments between the two elements because of the great flexibility of the blades consisting of several superimposed laminas. The flexion of the blades is well controlled because of the straight and parallel deformation and bearing zones. The pre-stressed fitting of the laminas ensures fluid-tightness in all operating conditions. No independent butt strip is necessary.

The invention claimed is:

1. A turboshaft engine comprising two longitudinally adjacent elements connected to each other with a seal installed between them, wherein said seal includes a plurality of flexible segments arranged in a ring,
   wherein each segment is mounted in a housing defined in one of the elements and comprises a flat blade having a straight deformation zone and a straight fluid-tight bearing zone bearing onto a flat and smooth surface of the other component, and
   wherein the element comprising said smooth surface is a casing and the element carrying said segments is a ring of sectors of vanes.

2. The turboshaft engine as claimed in claim 1, wherein each segment comprises several joined-together laminas forming said flat blade.

3. The turboshaft engine as claimed in claim 2, wherein said flat blade comprises thinned overlap zones at its ends and wherein said thinned overlap zones are defined by longitudinal offsets between said joined-together laminas.

4. The turboshaft engine as claimed in claim 2, wherein each of said joined together laminas is shaped such that it is pre-stressed on assembly, bearing against said smooth surface.

5. The turboshaft engine as claimed in claim 1, wherein each segment comprises an insert with a U-shaped profile and a straight opening in which said flat blade is mounted, said bending zone being defined outside of said insert in the vicinity of its straight opening.

6. The turboshaft engine as claimed in claim 5, wherein said insert is housed in a corresponding housing of the element which carries said segment.

7. The turboshaft engine as claimed in claim 6, wherein said insert comprises a protrusion which ensures its force-fitting in said housing.

8. The turboshaft engine as claimed in claim 1, wherein said flat blade comprises thinned overlap zones at its ends.

9. The turboshaft engine as claimed in claim 1, wherein the smooth surface is configured such that the bearing force of said blades is increased by an action of pressure existing on a side facing the ring of sectors of vanes.

10. A turboshaft engine comprising two longitudinally adjacent elements connected to each other with a seal installed between them, wherein said seal includes a plurality of flexible segments arranged in a ring,
    wherein each segment is mounted in a housing defined in one of the elements and comprises a flat blade having a straight deformation zone and a straight fluid-tight bearing zone bearing onto a flat and smooth surface of the other component,
    wherein each segment comprises an insert with a U-shaped profile and a straight opening in which said flat blade is mounted, said bending zone being defined outside of said insert in the vicinity of its straight opening,
    wherein said insert is housed in a corresponding housing of the element which carries said segment, and
    wherein said insert comprises a protrusion which ensures its force-fitting in said housing.

11. A turboshaft engine comprising two longitudinally adjacent elements connected to each other with a seal installed between them, wherein said seal includes a plurality of flexible segments arranged in a ring,
    wherein each segment is mounted in a housing defined in one of the elements and comprises a flat blade having a straight deformation zone and a straight fluid-tight bearing zone bearing onto a flat and smooth surface of the other component,
    wherein each segment comprises several joined-together laminas forming said flat blade, and
    wherein said flat blade comprises thinned overlap zones at its ends and wherein said thinned overlap zones are defined by longitudinal offsets between said joined-together laminas.

* * * * *